Patented Apr. 16, 1940

2,197,047

UNITED STATES PATENT OFFICE 2,197,047

COATING COMPOSITION

Irvin W. Humphrey and Joseph N. Borglin, Wilmington, Del., assignors to Hercules Powder Company, Wilmington, Del., a corporation of Delaware No Drawing. Application January 7, 1939, Serial No. 249,722

12 Claims. (Cl. 260—13)

This invention relates to coating compositions, more particularly, it relates to coating compositions containing a reaction product of an ester of a heterocyclic alcohol with an unsaturated rosin acid with maleic anhydride, the unsaturation of the heterocyclic alcohol radical being reduced by hydrogenation, or a product obtained by esterification of the above reaction product.

In preparing the reaction product or esterified reaction product used in the coating compositions of this invention, the monohydric heterocyclic alcohol may be hydrogenated and then reacted in the presence of heat with the unsaturated rosin acid, as abietic, pimaric, etc., to form a hydrogenated ester, the ester then reacted with maleic anhydride to form the acidic reaction product which is used as such or esterified with an alcohol.

The monohydric heterocyclic alcohol for use in preparing the reaction products used in the coating compositions of this invention may, for example, be furfuryl alcohol, methoxyfurfuryl alcohol, ethyl furfuryl alcohol, thienyl carbinol, ($C_4H_3S.CH_2OH$) dihydrofurfuryl alcohol, tetrahydrofurfuryl alcohol, etc., and the resin acid may be in the form, for example, of commercial abietic acid, wood or gum rosin, etc. As equivalents for the alcohols indicated, an inorganic ester of the alcohols, as, for example, furfuryl chloride, tetrahydrofurfuryl chloride, etc., may be used and equivalently where an ester is used in place of an alcohol, salts of abietic acid as, for example, sodium abietate, potassium abietate, etc., may be used, preferably in alcoholic solution, in place of abietic acid or rosin.

In carrying out the method for producing the reaction products used in the coating compositions of this invention, the heterocyclic alcohol, if not previously hydrogenated, will be hydrogenated to partially or fully saturate the radical thereof, and will, as has been indicated, be reacted in the presence of heat and, if desired, also in the presence of an acid catalyst, as, for example, p-toluene sulfonic acid, hydrogen chloride, boric acid, etc. Where an acid catalyst is used, however, such will be used in small quantity, say in amount of about 0.01% to 5.0% in order to avoid excessive polymerization of the alcohol. Further, if desired, a hydrocarbon as, for example, toluene, xylene, mineral spirits, or the like, may be used to assist in removing water of reaction.

The heterocyclic alcohol with partially or fully hydrogenated cyclic radical and abietic acid may then be treated in any desired quantities preferably with the alcohol in excess of that required for combination with the rosin acid. The reaction may be carried out at any suitable temperature, say, for example, within about the range of 100–300° C., with or without superatmospheric pressure depending upon the temperature. The time required will be dependent substantially upon the temperature and whether or not a catalyst is used. As has been indicated, an inorganic ester of a monohydric heterocyclic alcohol and a salt of abietic acid may be used equivalently for the alcohol and abietic acid and when such are used they will be desirably used in alcoholic solution as in solutions of ethyl, butyl, methyl, etc., alcohol and the reaction will be carried out under pressure depending upon the temperature used in order to avoid loss of the alcohol.

As illustrative of procedure for producing the reaction products used in the coating compositions of this invention, for the production, for example, of tetrahydrofurfuryl abietate, for example, 200 grams of rosin, 200 grams of tetrahydrofurfuryl alcohol, obtained by hydrogenation of furfuryl alcohol and 50 cc. of toluene are refluxed for about forty hours at about 200° C. Alternatively 1000 grams of rosin and 1000 grams of tetrahydrofurfuryl alcohol, 25 grams of p-toluene sulphonic acid and 50 cc. of toluene are treated at about 160° C. for about 16 hours.

The reaction may be speeded up in either case by autoclaving at say about 200–250° C. or by proceeding continuously as by passing the reagents through a reaction chamber at a relatively high temperature.

The crude product, tetrahydrofurfuryl abietate, may be purified by washing with an alkaline solution, if necessary, for example, a sodium carbonate solution, to remove excess abietic acid if present, distilling to remove volatiles and fractionation in vacuo to remove any polymerized ester if desired, though it will be understood that the polymerized ester will be as advantageous and equivalent of the unpolymerized ester for certain uses. The ester may be refined by dissolving in a suitable solvent, such as gasoline, mineral spirits, etc., and agitating with a substantially immiscible color body solvent as phenol, resorcinol, aniline, furfural, etc.

The ester, tetrahydrofurfuryl abietate, for example, may be formed by reacting 100 grams of tetrahydrofurfuryl chloride and 300 grams sodium resinate in solution in 1000 g. ethyl, or butyl, etc., alcohol by heating at about 125° C. under a pressure of about 110 pounds per square inch, for about one hour.

The tetrahydrofurfuryl abietate or dihydrofurfuryl abietate will then be reacted with maleic anhydride, or equivalently, maleic acid. Thus, by heating one mole of tetrahydrofurfuryl abietate, or one mole of dihydrofurfuryl abietate, with one mole of maleic anhydride at about 125–200° C., a combination occurs between the said abietate and the maleic anhydride to form a resinous, acidic reaction product. This resinous acidic reaction product may then be used in the coating compositions of this invention as such or may be esterified with an alcohol, e. g., a monohydric alcohol such as methyl, ethyl, propyl, butyl, bornyl, tetrahydrofurfuryl, benzyl, cyclohexanol, abietyl, hydroabietyl, stearyl, oleyl, naphthenyl, pimaryl, hydropimaryl, ethylene glycol monoethyl ether, etc., alcohols, or either partially or completely esterified with a polyhydric alcohol, such as ethylene glycol, diethylene glycol, triethylene glycol, glycerol, pentaerythrite, etc., or mixtures of the foregoing alcohols, yielding products also adapted for use in protective coatings and plastics. The esterified, or partially esterified product, may be modified by the addition of rosin, hydrogenated rosin, linseed oil or China-wood oil, the free acids of these oils, acids such as stearic, oleic, palmitic, abietic, hydroabietic, pimaric, hydropimaric, furoic, succinic, adipic, maleic acid or anhydride, phthalic acid or anhydride, etc.

As examples of the esterification of the tetrahydrofurfuryl abietate-maleic anhydride condensation product, (1) 400 grams of N wood rosin were esterified by heating with 270 grams of tetrahydrofurfuryl alcohol. The esterification was conducted at a temperature of 180–215° C. during 43 hours. Excess alcohol was then distilled off under reduced pressure, whereby 440 grams of a viscous liquid, acid number 57, were obtained. This product is tetrahydrofurfuryl abietate; (2) 400 grams of the above tetrahydrofurfuryl abietate were condensed with 102 grams of maleic anhydride by heating the reactants for five hours at temperature of 165–200° C. The resulting condensate, 480 grams, rated E in color; (3a) 200 grams of the above condensate from step 2 were heated with 296 grams of butanol for ten hours at a temperature of 120–130° C. Excess butanol was then distilled off under reduced pressure, leaving 220 grams of a soft resin. This product represents the butyl ester of the above condensate; (3b) 200 grams of the condensate from step 2 were heated with 102 grams of ethylene glycol for a period of eight hours at a temperature of from 200–212° C. Excess glycol was then distilled off under reduced pressure, whereby 240 grams of an E+ grade of glycol ester were obtained.

Steps 1, 2, 3a and 3b above were conducted under a blanket of carbon dioxide to prevent undue oxidation.

As will now be apparent, the resinous material used in the coating compositions of this invention will be an acidic reaction product of an ester of a monohydric heterocyclic alcohol having a partially or fully hydrogenated radical and an unsaturated rosin acid with maleic anhydride or a reaction product of the above acidic reaction product with an alcohol. Further, as will now be apparent, the method for producing the resinous material used in the coating compositions of this invention will involve hydrogenation of a monohydric heterocyclic alcohol to render the radical thereof partially or fully saturated with hydrogen, if it is not already; reaction of this alcohol with an unsaturated rosin acid, as abietic acid; and reaction of the ester so formed with maleic anhydride to form the resinous, acidic reaction product. Where the reaction product of this resinous, acidic reaction product with an alcohol is desired, the latter reaction product will be further reacted with an alcohol.

The resinous, acidic reaction product or the reaction product of the latter with an alcohol, produced according to the methods described above, are desirable for use variously, in the commercial arts and more especially, in accordance with this invention, as ingredients of coating compositions as, for example, lacquers, varnishes, paints, etc. The reaction products described above are useful in nitrocellulose lacquers generally and in lacquer compositions containing cellulose derivatives such as cellulose acetate and ethyl cellulose in proportions to give satisfactory compatibility.

As examples of coating compositions containing the acidic reaction product described above or the reaction product of the acidic reaction product with an alcohol, as described above, the following are illustrative:

*Example A*

| | Parts by weight |
|---|---|
| Nitrocellulose (low viscosity) | 12 |
| Ethyl alcohol | 5 |
| Toluene | 26 |
| Butanol | 5 |
| Ethyl acetate | 6 |
| Butyl acetate | 26 |
| Dammar gum solution | 10 |
| Reaction product produced in Example 3A | 10 |

The above lacquer will be found to have desirable properties in the coating of metal or wood surfaces in general. It will have excellent durability and discoloration resistance.

*Example B*

Eight parts by weight of the resinous, acidic material produced in Example 2 above or of the reaction product produced in Example 3a above, 4 parts by weight of dammar gum, 10 parts by weight of nitrocellulose and 78 parts of solvents and diluents are compounded in a lacquer. The lacquer may be used as in Example A and will have similar properties.

It will be understood that the details and examples hereinbefore set forth are illustrative only, and that the invention as broadly described and claimed is in no way limited thereby.

This application forms a continuation-in-part of our application Serial No. 152,666, filed July 8, 1937, which is in turn a continuation-in-part of our application, Serial No. 619,121 filed by Humphrey and Borglin June 24, 1932, for Resin acid ester and method of producing the same, now United States Patent Number 2,089,375.

Where in the appended claims the term "hydrofurfuryl" is used, it is intended to cover the dihydro- and tetrahydrofurfuryl radicals or a mixture thereof.

We claim:

1. A coating composition including a solvent and a synthetic resinous material selected from the group consisting of reaction products of an ester of a monohydric heterocyclic alcohol and an unsaturated rosin acid with maleic anhydride, the unsaturation of said alcohol being reduced by hydrogen, and reaction products of the above reaction products with an alcohol.

2. A coating composition including a solvent and a synthetic resinous material selected from the group consisting of reaction products of an ester of a hydrofurfuryl alcohol and an unsaturated rosin acid with maleic anhydride, and reaction products of the above reaction products with an alcohol.

3. A coating composition including a solvent and a synthetic resinous material selected from the group consisting of reaction products of an ester of a monohydric heterocyclic alcohol and abietic acid with maleic anhydride, the unsaturation of said alcohol being reduced by hydrogen, and reaction products of the above reaction products with an alcohol.

4. A coating composition including a solvent and a synthetic resinous material selected from the group consisting of reaction products of an ester of a hydrofurfuryl alcohol and abietic acid with maleic anhydride, and reaction products of the above reaction products with an alcohol.

5. A coating composition including nitrocellulose, a solvent and a synthetic resinous material selected from the group consisting of reaction products of an ester of a monohydric heterocyclic alcohol and abietic acid with maleic anhydride, the unsaturation of said alcohol being reduced by hydrogen, and reaction products of the above reaction products with an alcohol.

6. A coating composition including a solvent and a reaction product of hydrofurfuryl abietate with maleic anhydride.

7. A coating composition including a solvent and the reaction product of tetrahydrofurfuryl abietate with maleic anhydride.

8. A coating composition including a solvent and the reaction product of an alcohol with the reaction product of a hydrofurfuryl abietate and maleic anhydride.

9. A coating composition including a solvent and the reaction product of an alcohol with the reaction product of tetrahydrofurfuryl abietate and maleic anhydride.

10. A coating composition including nitrocellulose, a solvent and the reaction product of an alcohol with the reaction product of tetrahydrofurfuryl abietate and maleic anhydride.

11. A coating composition including a solvent and the reaction product of glycerol with the reaction product of tetrahydrofurfuryl abietate and maleic anhydride.

12. A coating composition including a solvent and the reaction product of butyl alcohol with the reaction product of tetrahydrofurfuryl abietate and maleic anhydride.

IRVIN W. HUMPHREY.
JOSEPH N. BORGLIN.